(12) United States Patent
Bouffier et al.

(10) Patent No.: US 12,128,737 B2
(45) Date of Patent: Oct. 29, 2024

(54) HEADLINER TRIM AND METHOD FOR PRODUCING A HEADLINER TRIM

(71) Applicant: KAUTEX TEXTRON GmbH & Co. KG, Bonn (DE)

(72) Inventors: Roman Bouffier, Konigswinter (DE); Hartmut Wolf, Konigswinter (DE)

(73) Assignee: KAUTEX TEXTRON GmbH & Co. KG, Bonn (DE)

( * ) Notice: Subject to any disclaimer, the term of this patent is extended or adjusted under 35 U.S.C. 154(b) by 767 days.

(21) Appl. No.: 17/295,016

(22) PCT Filed: Nov. 15, 2019

(86) PCT No.: PCT/EP2019/081520
§ 371 (c)(1),
(2) Date: May 18, 2021

(87) PCT Pub. No.: WO2020/104332
PCT Pub. Date: May 28, 2020

(65) Prior Publication Data
US 2022/0009311 A1    Jan. 13, 2022

(30) Foreign Application Priority Data
Nov. 19, 2018  (DE) .......................... 102018129059.4

(51) Int. Cl.
*B60R 13/02* (2006.01)
*B60H 1/00* (2006.01)
(Continued)

(52) U.S. Cl.
CPC ......... *B60H 1/245* (2013.01); *B60H 1/00564* (2013.01); *B60H 1/3407* (2013.01); *B60R 13/0225* (2013.01); *B60R 2013/0287* (2013.01)

(58) Field of Classification Search
None
See application file for complete search history.

(56) References Cited

U.S. PATENT DOCUMENTS 3,366,026 A * 1/1968 Herr ....................... B60H 1/262
264/46.7
6,203,092 B1   3/2001 Yoshinaka
(Continued)

FOREIGN PATENT DOCUMENTS

DE    8912883    8/1990
DE    4237344    5/1994
(Continued)

OTHER PUBLICATIONS

International Preliminary Report on Patenability, English translation, dated May 20, 2021 from International Bureau recieved from Richly & Ritschel Jun. 9, 2021, 6 pages.
(Continued)

*Primary Examiner* — Joseph D. Pape
(74) *Attorney, Agent, or Firm* — Lee & Hayes, P.C.

(57) ABSTRACT

A headliner trim for a motor vehicle includes a main body, at least one air channel formed in the main body for conducting an air flow through the main body, and at least one air outlet opening formed in the main body, through which air outlet opening the air flow conducted in the air channel can flow into the interior of the motor vehicle. The main body is formed from a particle foam, such as expanded polypropylene (EPP) or expanded polyethylene (EPE).

21 Claims, 6 Drawing Sheets

(51) Int. Cl.
*B60H 1/24* (2006.01)
*B60H 1/34* (2006.01)

(56) References Cited

U.S. PATENT DOCUMENTS

| | | | | |
|---|---|---|---|---|
| 6,633,026 | B2 * | 10/2003 | Tuominen | H04B 10/807 |
| | | | | 250/214 R |
| 6,899,381 | B1 * | 5/2005 | Fero | B60R 13/0225 |
| | | | | 296/214 |
| 6,918,169 | B2 * | 7/2005 | Mathew | B62D 65/06 |
| | | | | 29/430 |
| 2009/0217608 | A1 * | 9/2009 | Braun | B60H 1/245 |
| | | | | 52/302.1 |
| 2011/0056584 | A1 | 3/2011 | Onodera et al. | |

FOREIGN PATENT DOCUMENTS

| | | | |
|---|---|---|---|
| DE | 29706751 | | 6/1997 |
| DE | 10140387 A1 * | | 3/2003 ............. B60H 1/245 |
| DE | 60111114 | | 12/2005 |
| DE | 102009017758 | | 10/2010 |
| DE | 102011054392 | | 5/2012 |
| DE | 102016007913 | | 1/2018 |
| JP | S60110117 | | 6/1985 |
| JP | 4-46912 | * | 4/1992 |
| JP | H02089206 | | 4/1992 |
| JP | H09039610 | | 2/1997 |
| JP | 2005104185 | | 4/2005 |
| JP | 2007038531 | | 2/2007 |
| JP | 2003191749 | | 8/2007 |
| JP | 2015089467 | | 5/2015 |
| JP | 2018058551 | | 4/2018 |

OTHER PUBLICATIONS

PCT Seach Report for corresponding PCT International Application No. PCT/EP2019/081520 dated Feb. 19, 2020, 12 pages.
German Office Action for correpsonding DE Patent Application No. 2021-527203 dated May 10, 2022, 16 pages.

* cited by examiner

HEADLINER TRIM AND METHOD FOR PRODUCING A HEADLINER TRIM

This Application claims priority to PCT Application No. PCT/EP2019/081520, filed Nov. 15, 2019, which claims priority to German Patent Application Serial No. 102018129059.4, filed Nov. 19, 2018, the contents of each of which is incorporated herein by reference.

The invention relates to a headliner trim for a motor vehicle. The invention also relates to a method for producing a headliner trim for a motor vehicle.

A headliner trim is usually arranged on a part of the body of a motor vehicle that forms a headliner. Headliner trims are usually formed from a plurality of layers of different materials such that the headliner trims are formed from a multilayer composite. On the one hand, the manufacturing process for these multilayer composites is complex and requires several process steps. In addition, such multilayer composites are usually not recyclable due to their very different types of materials. If the interior of the motor vehicle is also to be ventilated via the headliner, the necessary air channels and air outlet openings can only be integrated in a complex manner because the air channels and air outlet openings must be integrated into the multilayer composite in the form of separate components or arranged outside the headliner trim. Since these separate components are often visible to the vehicle occupants, they are also perceived as annoying by the vehicle occupants.

The invention is thus based on the object of providing a headliner trim and a method for producing a headliner trim that make it possible to avoid the disadvantages referenced above.

According to the invention, this object is achieved by the features of the independent claims. Expedient embodiments and advantageous developments of the invention are specified in the dependent claims.

The headliner trim according to the invention is characterized in that it comprises a main body, at least one air channel formed in the main body for conducting an air flow through the main body and at least one air outlet opening formed in the main body, through which air outlet opening the air flow conducted in the air channel can flow into an interior of the motor vehicle, the main body being formed from a particle foam.

Furthermore, the object of the invention is achieved by a method for producing a headliner trim for a motor vehicle in which a main body is formed from a particle foam, wherein, when the particle foam of the main body is foamed, at least one air channel is formed in the main body for conducting an air flow through the main body and wherein, when the particle foam of the main body is foamed, at least one air outlet opening is formed in the main body, through which air outlet opening the air flow conducted in the air channel can flow into an interior of the motor vehicle.

According to the invention, a headliner trim with a main body is now provided, wherein a ventilation system which can be used to ventilate an interior of a motor vehicle is integrated directly into the main body.

The ventilation system comprises at least one air channel which extends inside the main body such that air can be conducted through the headliner trim via the air channel.

Furthermore, the ventilation system comprises at least one air outlet opening through which air can flow from the air channel into the interior of the motor vehicle. According to the invention, both the at least one air channel and the at least one air outlet opening can already be integrated into the main body during the formation and thus the manufacture of the main body, without additional components which otherwise usually form an air channel and an air outlet opening having to be introduced in a separate process step. The at least one air channel and the at least one air outlet opening are formed directly by the main body itself. The main body is formed from a particle foam. During the foaming of the particle foam and thus during the shaping of the main body, the at least one air channel and the at least one air outlet opening can then also be formed directly. The particle foam is preferably made of a thermoplastic material, for example expanded polypropylene (EPP) or expanded polyethylene (EPE). The particle foam preferably comprises a large number of particle foam beads which can foam and fuse when thermal energy such as superheated steam is supplied. The entire main body of the headliner trim is preferably formed from such a particle foam such that the main body is no longer made from a multilayer composite but from just one material. A headliner trim of which the main body is formed from a particle foam is characterized, in particular, by high strength, low weight, high temperature resistance, good chemical resistance, very good thermal insulation, good sound absorption and easy recyclability. Preferably, two or more air channels and/or two or more air outlet openings can also be arranged in the main body. The one or more air outlet openings preferably open on a longitudinal side surface of the main body that extends parallel to the headliner such that the air outlet openings can be arranged, for example, above the vehicle seats in the motor vehicle such that the individual vehicle occupants in the motor vehicle can be provided with individual air conditioning via these air outlet openings. Furthermore, it is also possible that the one or more air outlet openings are formed at an edge region of the main body such that the air outlet openings can be arranged in the vicinity of one or more vehicle window panes and the vehicle window panes can thus be air-conditioned via air outlet openings arranged on the headliner trim.

It can preferably be provided that the at least one air outlet opening is closed by means of an air-permeable material layer, wherein the air-permeable material layer can be arranged on a side surface of the main body that faces the interior of the motor vehicle. By means of the air-permeable material layer, the main body can be clad on one or more side surfaces that face the interior of the motor vehicle in order to improve the overall look of the headliner trim for the occupants of the motor vehicle. In addition, when the air flows through the air-permeable material into the interior of the motor vehicle, the air flow can be distributed more evenly such that the air flow can be perceived by the vehicle occupants as more pleasant, and the comfort for the vehicle occupants can thereby be improved. The air-permeable material layer is preferably arranged on the main body in such a way that it covers the at least one air outlet opening such that the air flowing from the air outlet opening has to pass through the air-permeable material layer. The air-permeable material layer preferably has a significantly smaller thickness than the main body. The air-permeable material layer is preferably designed in the form of a web. The air-permeable material layer can preferably cover all the side surfaces of the main body that are visible to the vehicle occupants. In particular, the air-permeable material layer can extend over the entire longitudinal side surface of the main body that faces the interior. The transverse sides of the main body, which are oriented at an angle to the longitudinal side surface of the main body, can be covered with the air-permeable material layer as well, however. The air-permeable material layer can, for example, be formed from a textile material and/or from a plastic material.

The air-permeable material layer can be fastened to the side surface of the main body by means of an integral bond between the air-permeable material layer and the main body, for example.

To fasten the air-permeable material layer to the side surface of the main body, the air-permeable material layer can be back-foamed with the particle foam of the main body, for example. The back-foaming can create a particularly stable integral bond between the air-permeable material layer and the main body. In addition, the air-permeable material layer can be fastened to the main body during the formation of the main body itself so that further process steps are not required. The air-permeable material layer can be inserted into the cavity, for example, by means of a tenter or with a so-called roll-to-roll method before the particle foam is foamed to form the main body in the cavity.

In order to be able to achieve particularly good adhesion of the air-permeable material layer to the main body, an adhesion promoter can be arranged between the main body and the air-permeable material layer. For example, before the air-permeable material layer is inserted into the cavity in which the particle foam of the main body is subsequently foamed, a side surface of the air-permeable material layer that faces the main body can be coated with the adhesion promoter. The adhesion promoter can, for example, be a low-melting polyolefin which has a melting point between 90° C. and 130° C.

To increase the amount of air that passes through the air-permeable material layer, the air-permeable material layer can be machined in the region of the at least one air outlet opening by means of a tool. For example, the individual openings in the air-permeable material layer through which the air flows can be enlarged in their cross section by means of the tool. The tool can be used, for example, to perforate and/or to thin the air-permeable material layer in the region of an air outlet opening. The tool can be designed, for example, in the form of a punching tool which can be moved within the cavity and on which cutters for perforating and/or thinning the air-permeable material layer can be arranged.

The air-permeable material layer can, for example, be formed from a decorative material, by means of which the visual impression of the headliner trim can be individually adapted.

It is also possible for a cover element to be arranged on a side surface of the main body that faces away from the interior of the motor vehicle. By means of the cover element, the at least one air channel formed in the main body can be closed in the direction of the headliner and thus in the direction of the body of the motor vehicle. The at least one air channel formed in the main body preferably has a U-shaped cross section such that three side walls of the air channel can be formed by the main body. This air channel having a U-shaped cross section can be covered by means of the cover element such that the cover element can then form a further, for example a fourth, side wall of the air channel. It is thus possible for the side walls of the air channel to be formed both by the main body and by the cover element. It can also be possible, for example, for the air channel to have a round cross section, wherein, to form the round cross-section, a first semicircular wall of the air channel is formed by the main body, and a second semicircular wall of the air channel is formed by the cover element such that the two semicircular walls together can form the wall delimiting the air channel. The side surface of the main body that faces away from the interior of the motor vehicle preferably forms an upper side of the main body. The cover element is preferably formed from a plastic material.

The cover element can be fastened to the main body by an integral bond and/or in a force-locking and/or form-fitting manner such that a secure and rigid connection can be formed between the main body and the cover element.

To form an integral bond, the cover element can be fastened to the main body by means of a welded connection, for example.

It is also possible that the cover element can additionally or alternatively be fastened to the main body by means of a latching connection. To form a latching connection, for example, a recess or an undercut can be provided on the main body into which a projection of the cover element can engage. It is also possible that the projection can be arranged on the main body and the recess or the undercut can be arranged on the cover element.

Another possibility for a connection between the cover element and the main body is to form a press-fit between the main body and the cover element.

The cover element can, for example, be formed from a particle foam in the same way as the main body. If the cover element is also formed from a particle foam, it can be easily and inexpensively recycled together with the main body. A cover element formed from a particle foam is characterized by high strength and very low weight. Furthermore, a welded connection can be formed particularly well between the main body and the cover element if both are formed from a particle foam.

The cover element can preferably have a particularly small thickness so that the overall thickness of the headliner trim can be reduced. For this purpose, the cover element can be designed, for example, as a film body which can be stretched over the side surface of the main body. If the cover element is designed as a film body, the cover element is preferably fastened to the main body by means of a welded connection. The film body can be a foam film, for example.

In order to be able to arrange additional components in the air outlet opening which, for example, can influence the direction and/or the force of the air flowing from the air outlet opening, it can be provided that a frame element is arranged on a wall delimiting the at least one air outlet opening. Additional components can also be mounted on the frame element after the main body has been foamed such that further components can be arranged and fastened by means of the frame element even after the main body has been foamed and thus after the air outlet opening has been formed in the main body. The additional components can be used, for example, to be able to change the cross section of the air outlet opening even after the air outlet opening has been formed, in that the additional components can be mounted in the air outlet opening on the frame element in order to reduce the cross section of the air outlet opening, for example.

The frame element can, for example, already be placed in the cavity when the main body is formed and thus when the air outlet opening is formed such that the frame element can be fastened in the air outlet opening in a form-fitting manner when the main body is formed and when the air outlet opening is formed in the main body.

Furthermore, it is also possible that the frame element is back-foamed with a particle foam and that it is integrally bonded to the main body.

The frame element can then be integrated into the fully foamed main body in an additional process step. The particle foam back-foamed on the frame element can, for example, be connected to the particle foam of the main body by welding. The thermal energy in the particle foam used for the foaming and fusing of the particle foam beads can be used for the welding.

The frame element can be produced in an injection molding process, for example.

The air channel formed in the main body can have different shapes, in particular different cross-sectional shapes. The at least one air channel can preferably have a rectangular or round cross section.

For this purpose, it can preferably be provided that a wall delimiting the at least one air channel is at least partially angular or round.

The wall delimiting the air channel can be formed completely or partially by the main body. If the wall delimiting the air channel is partially formed by the main body, then the wall delimiting the air channel is preferably formed by the cover element in the remaining region. It can therefore preferably be provided that part of a wall delimiting the at least one air channel is formed by the cover element. The part of the wall of the air channel which is formed by the cover element can be straight, curved or angular.

It can preferably be provided that at least one opening which is connected to the at least one air channel and via which an air flow can be conducted to a window pane of the motor vehicle is formed on a transverse side of the main body. By means of the opening, an air flow can be directly conducted to a window pane such as a windshield and/or a rear window and/or a side window of the motor vehicle, and can flow from the opening along the relevant window pane in order to ventilate or air-condition the relevant window pane. This makes it possible to also ventilate or air-condition the window panes of the motor vehicle from the headliner or the headliner trim, with the air-conditioning of the window panes being barely noticeable for the vehicle occupants, which makes it possible to significantly increase the comfort for the vehicle occupants. The opening can have one or more outlet openings for the air flow to exit. A plurality of openings is preferably arranged on the main body such that, for example, one or more openings can be assigned to each window pane of the motor vehicle. In order to be able to achieve an arrangement of the openings that is as directly adjacent to the window panes as possible, the one or more openings are preferably each arranged on one of the transverse sides of the main body. The openings are preferably formed directly in the main body when the main body is foamed. The one or more openings can, for example, be formed in the foaming particle foam by means of a slider. It is also possible that the openings are each designed as an insert, for example as an injection-molded insert, and are also inserted into the cavity of the foaming particle foam of the main body.

The openings can also be closed or covered at the top by means of the cover element.

In order to be able to achieve a particularly wide and uniform air flow, the at least one opening can have a cross section that increases in the direction of the window pane. The cross section of the opening preferably increases continuously. The opening can, for example, comprise a triangular cross-section such that the opening can have the shape of a diffuser, within which the speed of the air flow toward the opening can be reduced.

It is also possible for at least two guide elements to be arranged in the at least one opening. The guide elements can conduct the air flow in a targeted manner so that a particularly uniform distribution of the air flow over the entire cross section of the opening can be achieved. The guide elements can be designed as guide ribs, for example. The guide elements are preferably arranged in the opening at a distance from one another.

In order to be able to achieve particularly good recyclability of the headliner trim, it is preferably provided that the main body and/or the air-permeable material layer and/or the cover element are formed from the same particle foam material, in particular the same polymer particle foam material. For example, polypropylene or polyethylene can be used as the particle foam material for the main body and/or the air-permeable material layer and/or the cover element. If the same particle foam materials are used, the fastening of the components to one another can be improved as well, especially if the components are welded together.

In order to further increase the functionality of the headliner trim, it can be provided that the main body forms at least one cable guide and/or at least one cable clamp. A channel can be formed in the main body, for example, which can form the cable guide and/or the cable clamp. The cable guide and/or the cable clamp can be formed in the main body directly when it is manufactured such that the main body does not have to be subsequently reworked to form the cable guide and/or the cable clamp. Also, no additional components need to be provided in order to form a cable guide and/or cable clamp since these can be formed solely from the material of the main body. The cable guide and/or cable clamp can be used, for example, to guide and/or fix a lighting element integrated into the headliner trim or other electronic components accommodated in the headliner trim.

The invention is explained in greater detail in the following with reference to the accompanying drawings using preferred embodiments.

Figure 1:
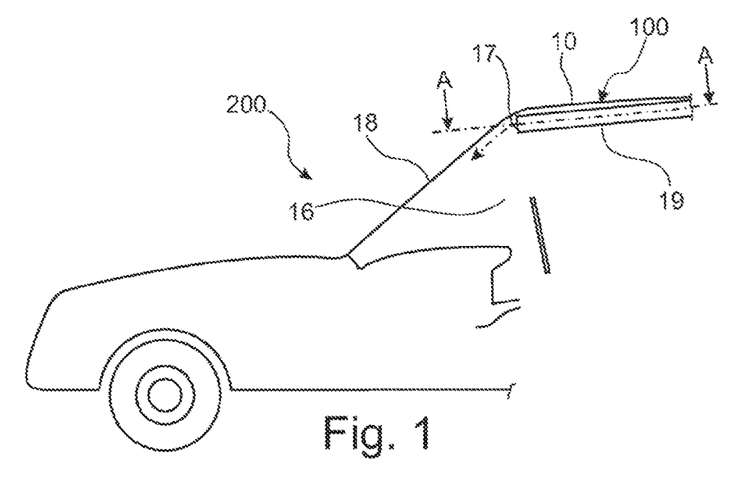
FIG. 1 is a schematic representation of a motor vehicle with a headliner trim according to the invention.

FIG. 1 schematically shows a portion of a motor vehicle 200 on the headliner 10 of which a headliner trim 100 is arranged.

Figure 2:
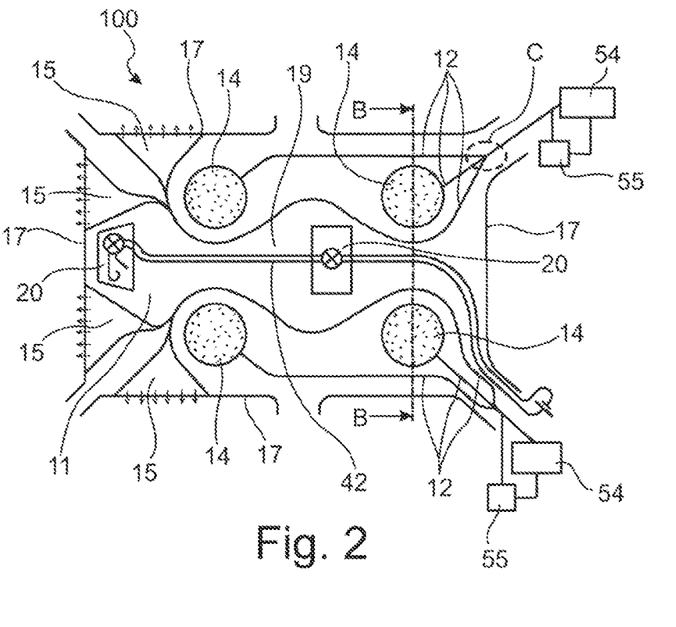
FIG. 2 is a schematic sectional representation along the line A-A of the headliner trim shown in FIG. 2.

FIG. 2 shows a section along the line A-A shown in FIG. 1 of the headliner trim 100. The headliner trim 100 preferably extends over the entire length and width of the headliner 10.

The headliner trim 100 comprises a main body 11 which can extend over the entire width and length of the headliner 10. The main body 11 has a substantially rectangular shape. As can be seen in FIGS. 1 and 2, the main body 11 is planar. On the main body 11, air channels 12 are formed through which one or more air flows 13, as indicated with the arrows in FIG. 3, can be conducted through the main body 11.

Furthermore, a plurality of air outlet openings 14 are formed in the main body 11, through which air outlet openings an air flow 13 can flow into an interior 16 of the motor vehicle 200 in which the vehicle occupants are seated. In the embodiment shown here, four air outlet openings 14 are formed on the main body 11, which are each arranged above the vehicle seats of the vehicle occupants in the motor vehicle 200. Furthermore, a plurality of openings 15 are formed in the main body 11, through which openings an air flow 13 can also flow into the interior 16 of the motor vehicle 200, wherein the openings 15 are arranged on a transverse side 17 of the main body 11 such that an air flow 13 can be conducted through the openings 15 directly to a window pane 18 of the motor vehicle 200 in order to be able to ventilate, in particular de-ice, the relevant window pane 18. In contrast, the air outlet openings 14 are formed on a longitudinal side surface 19 of the main body 11.

The main body 11 is formed from a particle foam which is foamed and in which the particle foam beads are fused by supplying thermal energy. The air channels 12, the air outlet openings 14 and the openings 15 are molded directly into the main body 11 when the main body 11 is foamed. When the particle foam of the main body 11 is foamed, further components such as lighting elements 20 can be incorporated directly into the main body 11 and thus into the headliner trim 100.

Figure 3:
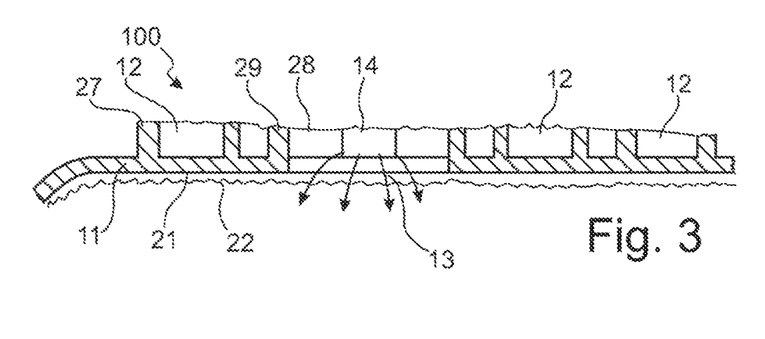
FIG. 3 is a schematic sectional representation along the line B-B shown in FIG. 2.

As can be seen in particular in FIG. 3, an air-permeable material layer 22 is arranged on a side surface 21 of the main body 11 that faces the interior 16 of the motor vehicle 200 and in this case forms an underside of the main body 11. The air-permeable material layer 22 covers the air outlet openings 14 such that the air outlet openings 14 are not visible to the vehicle occupants. As shown in FIG. 3 with the help of the arrows, the air flow 13 can flow through the air-permeable material layer 22.

The air-permeable material layer 22 is integrally bonded to the main body 11 in that the air-permeable material layer 22 is back-foamed with the particle foam of the main body 11. For this purpose, the air-permeable material layer 22 is introduced into the cavity of the molding tool when the main body 11 is foamed and clamped between two mold halves 23, 24 of the molding tool that form the cavity, as can be seen in FIG. 4.

Figure 4:
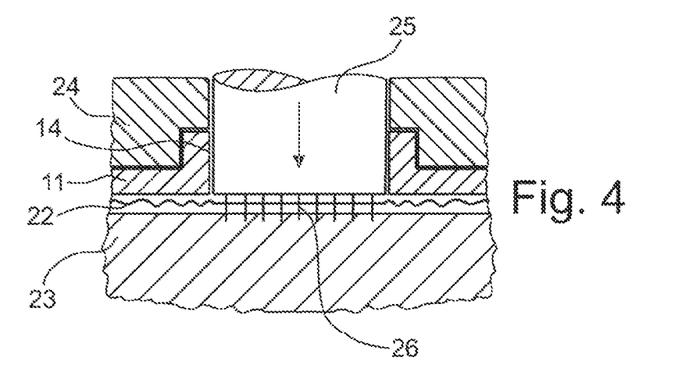
FIG. 4 is a schematic sectional representation of a cavity with a tool movably arranged therein for machining the air-permeable material layer.

In order to be able to improve the permeability of the air-permeable material layer 22, the air-permeable material layer 22 can be machined by means of a tool 25, as shown in FIG. 4. As shown in FIG. 4, the tool 25 can be moved perpendicularly to the clamped air-permeable material layer 22. For example, the individual openings in the air-permeable material layer 22 through which the air flows can be enlarged in their cross section by means of the tool 25. The tool 25 can be used, for example, to perforate and/or thin the air-permeable material layer 22 in the region of an air outlet opening 14. The tool 25 can be designed, for example, in the form of a punching tool which can be moved within the cavity and on which cutters 26 can be arranged for perforating and/or thinning the air-permeable material layer 22.

The air-permeable material layer 22 can be designed as a film. The air-permeable material layer can, for example, be formed from a decorative material, which can be formed from a plastic material and/or a textile material. As with the main body 11, the air-permeable material layer 22 can be formed from a particle foam.

Figure 8:
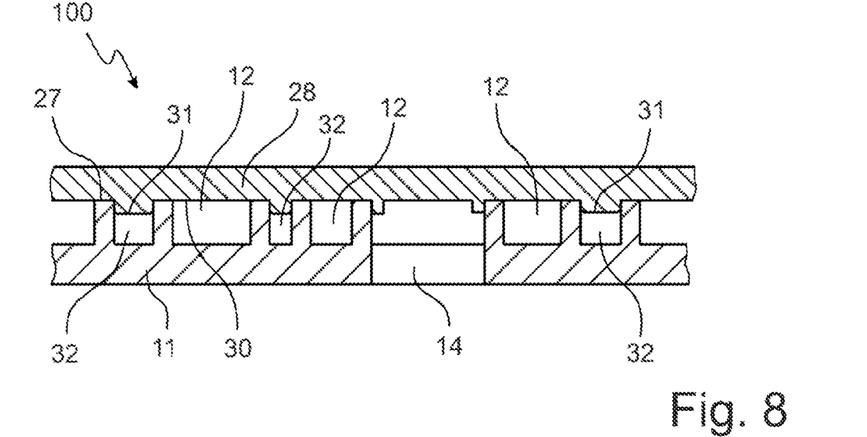
FIG. 8 is a further schematic sectional representation of a headliner trim according to the invention.

A cover element 28 is also arranged on a side surface 27 of the main body 11 that faces away from the interior 16 of the motor vehicle 200 and forms an upper side of the main body 11, as can be seen in FIGS. 3 and 8, for example. By means of the cover element 28, the air channels 12 can be closed in the direction of the headliner 10 and thus in the direction of the body of the motor vehicle 200.

As can be seen in FIGS. 3 and 8, the air channels 12 each have a U-shaped cross section such that the main body 11 forms three side walls of an air channel 12. These air channels 12 having a U-shaped cross section can be covered by means of the cover element 28 such that the cover element 28 forms a fourth side wall of the air channels 12.

As shown in FIG. 3, the cover element 28 can be designed in the form of a film, for example a foam film. Furthermore, it is also possible, as shown in FIG. 8, for the cover element 28 to have a greater thickness and to be designed in the form of a foam body, for example a foam body made from a particle foam.

The cover element 28 can be fastened, for example, by means of a welded connection 29 between the cover element 28 and the main body 11.

As can also be seen in FIG. 8, projections 31 can be formed on a side surface 30 of the cover element 28 that faces the main body 11. These projections can protrude, at least in some regions, into fastening openings 32 and/or into the air channels 12 in order to fasten the cover element 28 to the main body 11 in a force-locking and/or form-fitting manner.

The projections 31 can, for example, be pressed into the fastening openings 31 and/or the air channels 12 of the main body 11 in order to form a press-fit between the cover element 28 and the main body 11.

Figure 9:
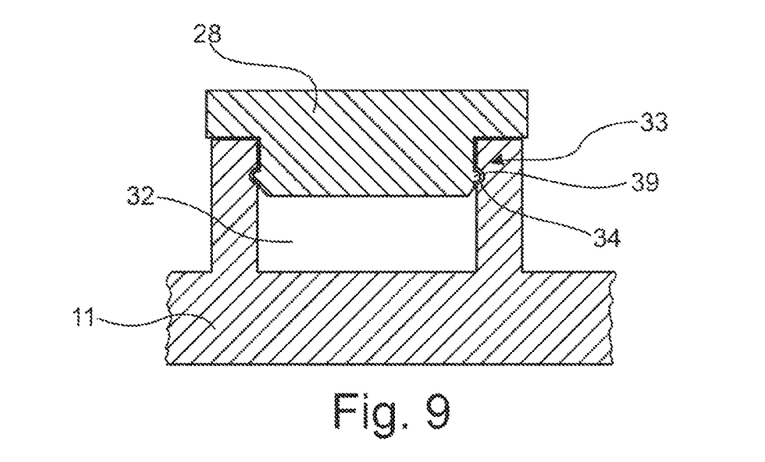
FIG. 9 is a detailed schematic representation of a fastening of a cover element to a main body of the headliner trim.

It is also possible to fasten the cover element 28 to the main body 11 by means of a latching connection 33 as shown in FIG. 9. To form the latching connection 33, a recess 34 or undercut is formed on the main body 11 into which a projection 39 of the cover element 28 can engage. The recess 34 is formed on a wall of the air channel 12 and/or a wall of the fastening opening 32. The projection 39 is arranged on the projection 31 of the cover element 18.

Figure 5:
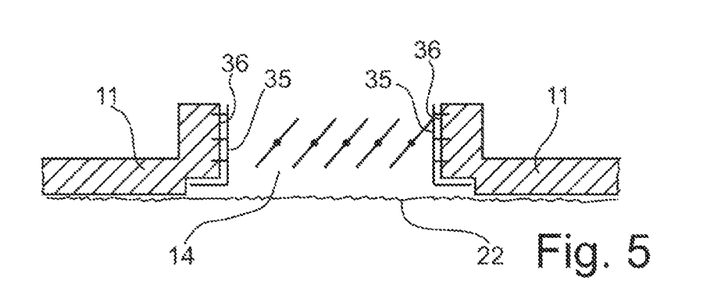
FIG. 5 is a schematic sectional representation in the region of an air outlet opening with a frame element arranged therein.

As shown for example in FIG. 5, a frame element 35 that can be fastened to a wall 36 delimiting the air outlet opening 14 can be arranged in the air outlet opening 14. Further additional components can also be arranged and fastened to the frame element 35 after the main body 11 has been foamed and therefore after the air outlet opening 14 has been formed in the main body 11. The additional components can be used, for example, to be able to change the cross section of the air outlet opening 14 even after the air outlet opening 14 has been formed in that the additional components are mounted in the air outlet opening 14 on the frame element 35 in order to reduce the cross section of the air outlet opening 14, for example.

The frame element 35 can be formed from a plastic material and can be an injection-molded part, for example.

In the embodiment shown in FIG. 5, the frame element 35 is form-fittingly connected to the main body 11.

Figure 6:
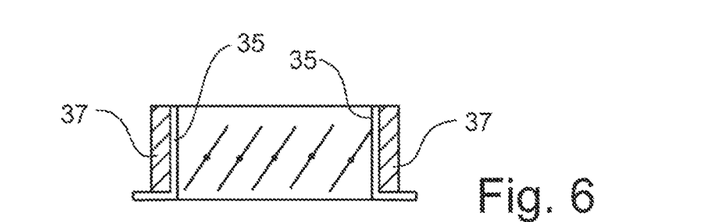
FIG. 6 is a schematic sectional representation of a frame element with back-foamed particle foam before an insertion into the air outlet opening.
Figure 7:
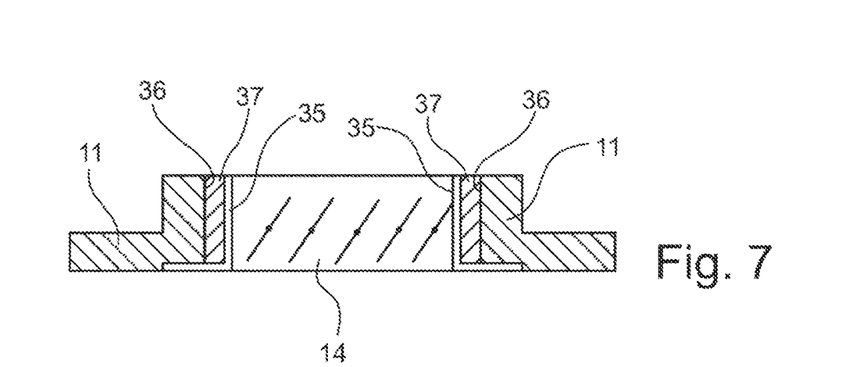
FIG. 7 is a schematic sectional representation of a frame element as shown in FIG. 6 inserted into an air outlet opening.

FIGS. 6 and 7 show an embodiment in which the frame element 35 is initially back-foamed with a particle foam 37. FIG. 6 shows the frame element 35 with the back-foamed particle foam 37, wherein the particle foam 37 is arranged on an outer surface of the frame element 35 which, in the mounted state, faces the wall 36 of the air outlet opening 14 of the main body 11.

The frame element 35, which is already back-foamed with the particle foam 37, is then introduced into the already completely foamed main body 11 by inserting the frame element 35 into the air outlet opening 14. After the insertion, the particle foam 37 arranged on the frame element 35 is then welded to the particle foam of the main body 11, as shown in FIG. 7.

Figure 10:
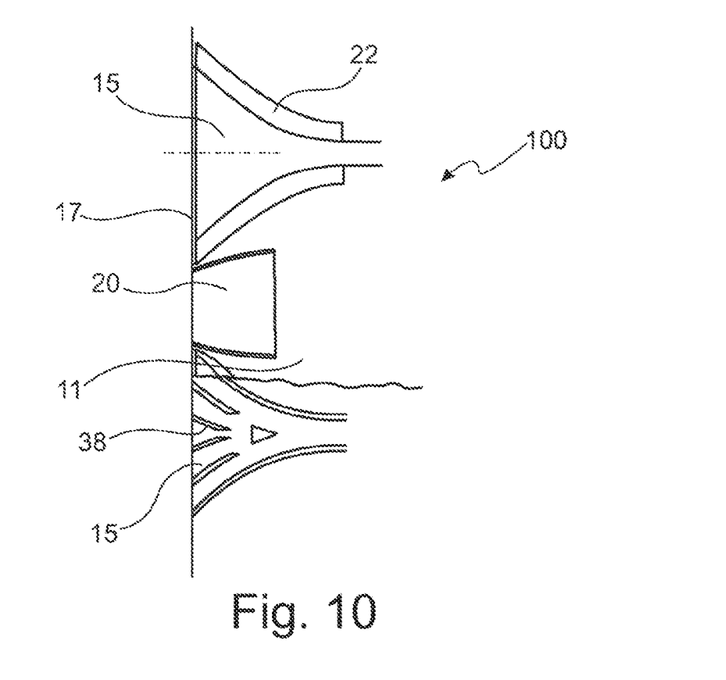
FIG. 10 is a schematic sectional representation of the headliner trim shown in FIG. 2 in the region of the openings.

FIG. 10 shows a sectional representation of the headliner trim 100 shown in FIG. 1 so that the openings 15, which face the windshield of the motor vehicle 200, can be seen in an at least partially sectional plan view.

As can be seen in FIG. 10, the cross section of the opening 15 increases in the direction of the window pane 18, which is the windshield in this case. In the embodiment shown here, the cross section of the opening 15 increases continuously toward the window pane 18. The opening 15 has the shape of a diffuser within which the speed of the air flow 13 toward the opening 15 can be reduced.

As can also be seen in FIG. 10 (bottom sectional view), a plurality of guide elements 38 are arranged in the opening 15. The guide elements 38 can conduct the air flow 13 in a targeted manner so that a particularly uniform distribution of the air flow 13 over the entire cross section of the opening 15 can be achieved. The guide elements 38 form guide ribs for the air flow 13.

In the top illustration of FIG. 10, it can be seen that the air-permeable material layer 22 is also arranged in the region of the opening 15 and is welded there, for example, to be fastened to the main body 11. If the opening 22 is formed by an insert inserted into the main body 11, the air-permeable material layer 22 can be welded to this insert.

The window pane 18 can now be de-iced from the headliner trim 100 via the opening 15 such that the air flow 13 is not blown from below in the direction of the vehicle occupants' faces but from the top downwards so that the vehicle occupants do not feel the air flow 13, which makes it possible for a significantly stronger air flow 13 to be conducted through the opening 15 in the direction of the window pane 18 in order to de-ice the window pane 18.

The headliner trim 100 with the ventilation system integrated therein thus allows both for a customizable overhead ventilation of the vehicle occupants and, in addition, de-icing of the window pane via the headliner trim 100. Thus, the ventilation in the instrument panel of the motor vehicle 200 can be reduced or even eliminated entirely.

Figure 11:
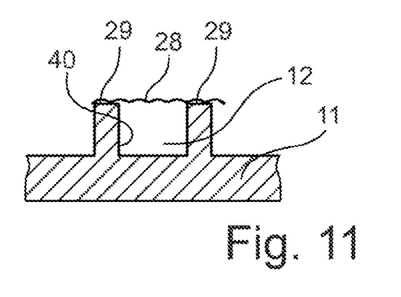
FIG. 11 is a schematic sectional representation of an air channel with a wall delimiting the air channel, which is designed to be angular in some regions.
Figure 12:
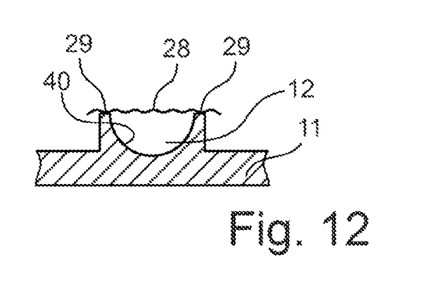
FIG. 12 is a schematic sectional representation of an air channel with a wall delimiting the air channel, which is designed to be round in some regions.
Figure 13:
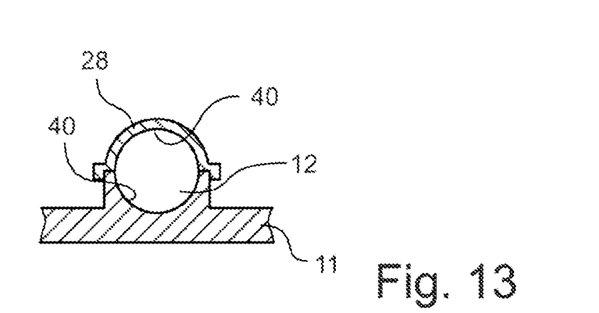
FIG. 13 is a schematic sectional representation of an air channel with a wall delimiting the air channel, which is designed to be completely round.

FIGS. 11 to 13 show different embodiments of an air channel 12.

In the embodiment shown in FIG. 11, a wall 40 delimiting the air channel 12 has an angular design in some regions, wherein the region of the wall 40 that is formed by the main body 11 has an angular shape. The cover element 28 also forms part of the wall 40, with the cover element 28 being straight. In this case, the cover element 28 is preferably designed as a film body and welded to the main body 11 in order to close the air channel 12 as tightly as possible. In the embodiment shown in FIG. 11, the air channel 12 has a rectangular cross section, with three side walls of the air channel 12 being formed by the main body 11 and one side wall of the air channel 12 being formed by the cover element 28, which together form the wall 40 delimiting the air channel 12.

FIG. 12 shows a further possible embodiment of an air channel 12 in which the wall 40 delimiting the air channel 12 is round or curved in some regions, with the region of the wall 40 formed by the main body 11 being round. In this case, too, the cover element 28 forms part of the wall 40, with the cover element 28 also being straight here. In this case, the cover element 28 is preferably designed as a film body and welded to the main body 11 in order to close the air channel 12 as tightly as possible. In the embodiment shown in FIG. 11, the air channel 12 has a substantially semi-circular cross section, with three side walls of the air channel 12 being formed by the main body 11 and one side wall of the air channel 12 being formed by the cover element 28, which together form the wall 40 delimiting the air channel 12.

In the embodiment shown in FIG. 13, the entire wall 40 delimiting the air channel 12 is round so that the air channel 12 has a round cross section. Both the region of the wall 40 which is formed by the main body 11 and the region of the wall 40 which is formed by the cover element 28 are round. In such a round configuration, the conduction of air through the air channel 12 is particularly good, and it is possible to avoid turbulence that can otherwise usually arise at edges. In this case, the cover element 28 can be designed, for example, in the form of a foam body.

Figure 14:
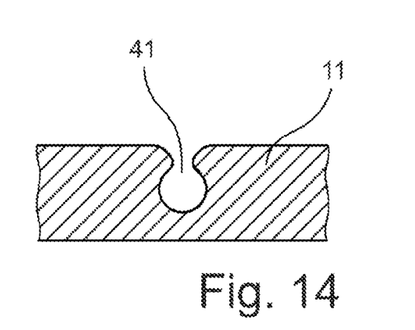
FIG. 14 is a schematic sectional representation of a cable guide formed in the main body.

FIG. 14 shows a cable guide 41 which is formed in the main body 11 by molding the cable guide 41 in the main body 11 when the main body 11 is molded. The cable guide 41 can be designed as a groove-shaped recess in the main body 11. A cable 42 can be inserted into and guided in the cable guide 41, as shown for example in FIG. 2. This cable can be connected to one or both lighting elements 20 in order to electrically connect same.

Figure 15:
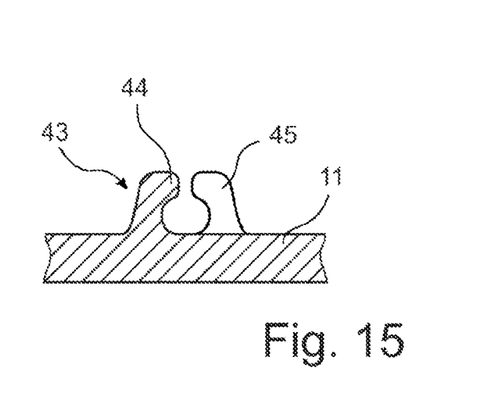
FIG. 15 is a schematic sectional representation of a cable clamp formed in the main body.

FIG. 15 shows a cable clamp 43 in which, for example, a cable 42 can be held so as to be clamped. The cable clamp 43 is also designed in this case to be directly integrated into the main body 11 by forming the cable clamp 43 from the material of the main body 11 as well. The cable clamp 43 can thus be formed directly on the main body 11 at the same time as the main body 11 is formed. In the embodiment shown here, the cable clamp 43 comprises two opposing clamping arms 44, 45 which protrude from a surface of the main body 11. The clamping arms 44, 45 are designed to be bent toward one another at least at their free end such that they can grip around a cable 42 to be clamped.

Figure 16:
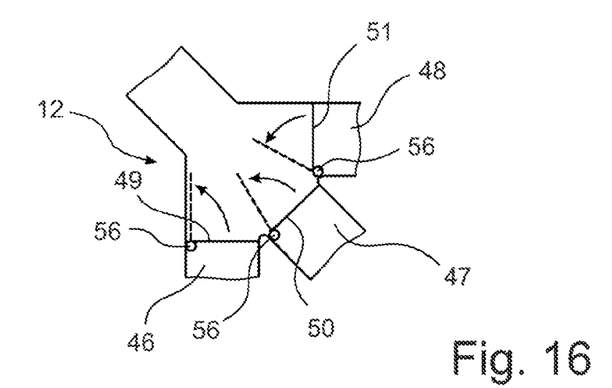
FIG. 16 is a schematic sectional representation of region C as shown in FIG. 2 at a fork of the air channel according to a first embodiment.
Figure 17:
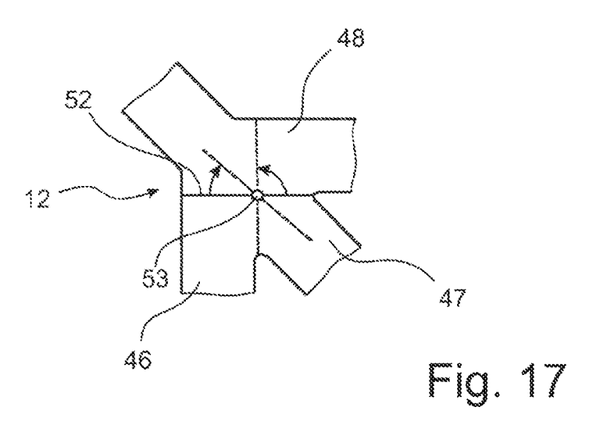
FIG. 17 is a schematic sectional representation of region C as shown in FIG. 2 at a fork in the air channel according to a second embodiment.

FIGS. 16 and 17 show two possible embodiments for the formation of the air channel 12 in the region C shown in FIG. 2, which is where the air flows into the headliner trim 100 via the air channel 12. In this region, the air channel 12 splits into three air channel portions 46, 47, 48, which each conduct the air to the air outlet openings 14 and/or to the openings.

In order to be able to control the flow of air through the individual air channel portions 46, 47, 48, control flaps 49, 50, 51 are arranged on each air channel portion 46, 47, 48, which flaps can be moved, in particularly pivoted, to an open position and a closed position, as indicated in FIG. 16 by the arrows. In an open position, air can flow into the relevant air channel portion 46, 47, 48. In the closed position, the control flap 49, 50, 51 closes the relevant air channel portion 46, 47, 48 such that no air can flow into the relevant air channel portion 46, 47, 48. The control flaps 49, 50, 51 are each articulated so as to be movable by means of an articulated connection 56 on a wall of the air channel 12 or the air channel portions 46, 47, 48.

FIG. 17 shows an embodiment in which only one control flap 52 is arranged in the air channel 12. Depending on its position, this control flap can control a supply of air into the individual air channel portions 46, 47, 48. The control flap 52 is rotatably or pivotably mounted at a pivot point 53. By means of such a control flap 52, either all air channel portions 46, 47, 48 can be opened or two air channel portions 46, 47, 48 are closed and one air channel portion 46, 47, 48 is opened. The possible positions of the control flap 52 are indicated in FIG. 17.

The air supply into the air channel 12 and the air channel portions 46, 47, 48 can also be regulated by other means, for example by arranging valves.

As shown in FIG. 2, the air channels 12 can be connected to an air-conditioning device 54, by means of which the temperature of the air flowing through the air channel 12 can be adjusted.

Furthermore, it is also possible to provide a control device 55 which can, for example, regulate the amount and/or the speed of the air flowing through the air channel 12 and/or control the air-conditioning device 54 and/or the movement of the control flaps 49, 50, 51 52.

LIST OF REFERENCE SIGNS

100 Headliner trim
200 Motor vehicle
10 Headliner
11 Main body
12 Air channel
13 Air flow
14 Air outlet opening
15 Opening
16 Interior
17 Transverse side
18 Window pane
19 Longitudinal side surface
20 Lighting element
21 Side surface
22 Air-permeable material layer
23 Mold half
24 Mold half
25 Tool
26 Cutter
27 Side surface
28 Cover element
29 Welded connection
30 Side surface
31 Projection
32 Fastening opening
33 Latching connection
34 Recess
35 Frame element
36 Wall
37 Particle foam
38 Guide element
39 Projection
40 Wall
41 Cable guide
42 Cable
43 Cable clamp
44 Clamping arm
45 Clamping arm
46 Air channel portion
47 Air channel portion
48 Air channel portion
49 Control flap
50 Control flap
51 Control flap
52 Control flap
53 Pivot point
54 Air-conditioning device
55 Control device
56 Articulated connection

The invention claimed is:

1. A headliner trim for a motor vehicle, the headliner trim comprising:
a main body;
at least one air channel formed in the main body for conducting an air flow through the main body; and
at least one air outlet opening, formed in the main body, such that the air flow conducted in the at least one air channel can flow through the at least one air outlet opening into an interior of the motor vehicle,
wherein the main body is entirely formed from a particle foam,
wherein the at least one air outlet opening is closed by an air-permeable material layer,
wherein the air-permeable material layer is arranged on a side surface of the main body that faces the interior of the motor vehicle, and
wherein:
in order to fasten the air-permeable material layer to the side surface of the main body, the air-permeable material layer is back-foamed with the particle foam of the main body, or
an adhesion promoter is arranged between the main body and the air-permeable material layer.

2. The headliner trim according to claim 1, wherein the air-permeable material layer is formed from a decorative material.

3. The headliner trim according to claim 1, wherein a cover element is arranged on a side surface of the main body that faces away from the interior of the motor vehicle.

4. The headliner trim according to claim 3, wherein the cover element is fastened to the main body by an integral bond and/or in a force-locking and/or form-fitting manner.

5. The headliner trim according to claim 3, wherein the cover element is fastened to the main body via a welded connection.

6. The headliner trim according to claim 3, wherein the cover element is fastened to the main body via a latching connection.

7. The headliner trim according to claim 3, wherein the cover element is formed from a particle foam.

8. The headliner trim according to claim 3, wherein the cover element is a film body.

9. The headliner trim according to claim 1, wherein a frame element is arranged on a wall delimiting the at least one air outlet opening.

10. The headliner trim according to claim 9, wherein the frame element is back-foamed with a particle foam and is integrally bonded to the main body.

11. The headliner trim according to claim 1, further comprising a wall delimiting the at least one air channel is at least partially angular or round.

12. The headliner trim according to claim 3, wherein at least part of a wall delimiting the at least one air channel is formed by the cover element.

13. The headliner trim according to claim 1, wherein at least one opening, which is connected to the at least one air channel, and via which an air flow can be conducted to a window pane of the motor vehicle, is formed on a transverse side of the main body.

14. The headliner trim according to claim 13, wherein the at least one opening has a cross section which increases in the direction of the window pane.

15. The headliner trim according to claim 13, wherein at least two guide elements are arranged in the at least one opening.

16. The headliner trim according to claim 3, wherein the main body and/or the air-permeable material layer and/or the cover element are formed from the same particle foam material.

17. The headliner trim according to claim 1, wherein the main body forms at least one cable guide and/or at least one cable clamp.

18. A method for producing a headliner trim for a motor vehicle, the method comprising:
  forming a main body from a particle foam,
    wherein, when the particle foam of the main body is foamed, at least one air channel is formed in the main body for conducting an air flow through the main body,
    wherein, when the particle foam of the main body is foamed, at least one air outlet opening is formed in the main body, through which air outlet opening the air flow conducted in the air channel can flow into an interior of the motor vehicle, and
  wherein the method further comprises:
    fastening an air-permeable material layer to a side surface of the main body via back-foaming the air-permeable material layer with the particle foam of the main body, or
    an adhesion promoter is arranged between the main body and the air-permeable material layer.

19. The method according to claim 18, wherein the air outlet opening is closed via the air-permeable material layer, and
  wherein the air-permeable material layer is arranged on the side surface of the main body that faces the interior of the motor vehicle.

20. The method according to claim 18, wherein the air-permeable material layer is machined via a tool in the region of the at least one air outlet opening to increase the amount of air that passes through the air-permeable material layer.

21. The method according to claim 18, wherein, during the foaming of the particle foam of the main body, at least one opening which is connected to the at least one air channel and via which an air flow can be conducted to a window pane of the motor vehicle is formed on a transverse side of the main body.

\* \* \* \* \*